United States Patent
Frohlick et al.

(10) Patent No.: US 12,223,822 B2
(45) Date of Patent: Feb. 11, 2025

(54) METHODS AND ARRANGEMENTS FOR SENSORS

(71) Applicant: Intel Corporation, Santa Clara, CA (US)

(72) Inventors: Eric Frohlick, Hillsboro, OR (US); Xiaofan Chen, San Jose, CA (US); Srinivas Eerpina, Sunnyvale, CA (US); Ronaldo J. Guarin, San Jose, CA (US); William D. Angell, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/976,653

(22) Filed: Oct. 28, 2022

(65) Prior Publication Data

US 2023/0117961 A1 Apr. 20, 2023

Related U.S. Application Data

(63) Continuation of application No. 17/134,275, filed on Dec. 26, 2020, now Pat. No. 11,488,465, which is a
(Continued)

(51) Int. Cl.
*G08B 25/00* (2006.01)
*G08B 19/00* (2006.01)
*H04W 4/12* (2009.01)

(52) U.S. Cl.
CPC .......... *G08B 25/007* (2013.01); *G08B 19/00* (2013.01); *G08B 25/00* (2013.01); *H04W 4/12* (2013.01)

(58) Field of Classification Search
CPC ............... G08B 1/08; G08B 13/19658; G08B 13/19691; G08B 25/00; G08B 25/14;
(Continued)

(56) References Cited

U.S. PATENT DOCUMENTS 5,920,270 A 7/1999 Peterson
6,115,393 A 9/2000 Engel et al.
(Continued)

FOREIGN PATENT DOCUMENTS

CN 1949814 4/2007
CN 101014173 A 8/2007
(Continued)

OTHER PUBLICATIONS

NPL Search (Dec. 17, 2023).*
(Continued)

*Primary Examiner* — Van T Trieu
(74) *Attorney, Agent, or Firm* — Hanley, Flight & Zimmerman, LLC

(57) ABSTRACT

Example methods and arrangements for sensors are disclosed herein. At least one storage device or storage disk includes instructions that, when executed, cause at least one processor of a mobile electronic device to at least access notification data indicative of an event at a security perimeter of a building, the notification data corresponding to a change in a status of one or more sensors at the security perimeter; present the notification data to a user of the mobile electronic device, the notification data including image data associated with the event; generate a message based on a user input at the mobile electronic device in response to the notification data; and output the message to cause a responsive action.

23 Claims, 4 Drawing Sheets

Related U.S. Application Data continuation of application No. 16/249,549, filed on Jan. 16, 2019, now Pat. No. 10,902,715, which is a continuation of application No. 16/114,166, filed on Aug. 27, 2018, now Pat. No. 10,567,928, which is a continuation of application No. 15/488,369, filed on Apr. 14, 2017, now Pat. No. 10,064,027, which is a continuation of application No. 14/145,748, filed on Dec. 31, 2013, now Pat. No. 9,648,476, which is a continuation of application No. 13/925,491, filed on Jun. 24, 2013, now Pat. No. 8,957,776, which is a continuation of application No. 12/567,705, filed on Sep. 25, 2009, now Pat. No. 8,471,707.

(58) Field of Classification Search
CPC ..... H04M 3/42; H04M 11/04; H04L 12/2827; H04W 4/00; H04W 4/22
See application file for complete search history.

(56) References Cited

U.S. PATENT DOCUMENTS

| | | | |
|---|---|---|---|
| 6,904,391 | B2 | 6/2005 | Merkin et al. |
| 7,006,881 | B1 | 2/2006 | Hoffberg et al. |
| 7,026,926 | B1 | 4/2006 | Walker, III |
| 7,148,796 | B2 | 12/2006 | Joy et al. |
| 7,242,295 | B1 | 7/2007 | Milinusic et al. |
| 7,340,379 | B2 | 3/2008 | Kunkel et al. |
| 7,342,489 | B1 | 3/2008 | Milinusic et al. |
| 7,456,733 | B2 | 11/2008 | Joy et al. |
| 7,581,166 | B2 | 8/2009 | Renger et al. |
| 7,724,131 | B2 | 5/2010 | Chen |
| 7,786,891 | B2 * | 8/2010 | Owens ............... H04L 12/2827 340/12.54 |
| 7,827,009 | B2 | 11/2010 | Kunkel |
| 7,942,314 | B1 | 5/2011 | Grimm et al. |
| 8,099,902 | B2 | 1/2012 | Christensson et al. |
| 8,321,526 | B2 | 11/2012 | Raleigh |
| 8,350,694 | B1 | 1/2013 | Trundle et al. |
| 8,385,971 | B2 | 2/2013 | Rhoads et al. |
| 8,396,446 | B2 | 3/2013 | Frenette et al. |
| 8,471,707 | B2 | 6/2013 | Frohlick et al. |
| 8,489,132 | B2 | 7/2013 | Karmarkar et al. |
| 8,626,739 | B2 | 1/2014 | Auerbach et al. |
| 8,674,842 | B2 | 3/2014 | Zishaan |
| 8,952,894 | B2 | 2/2015 | Wilson |
| 8,957,776 | B2 | 2/2015 | Frohlick et al. |
| 9,251,684 | B2 | 2/2016 | Frohlick et al. |
| 9,418,529 | B2 | 8/2016 | Frohlick et al. |
| 9,648,476 | B2 | 5/2017 | Frohlick et al. |
| 10,064,027 | B2 | 8/2018 | Frohlick et al. |
| 10,075,828 | B2 | 9/2018 | Horton et al. |
| 10,567,928 | B2 | 2/2020 | Frohlick et al. |
| 10,902,715 | B2 | 1/2021 | Frohlick et al. |
| 11,488,465 | B2 | 11/2022 | Frohlick et al. |
| 2002/0080938 | A1 | 6/2002 | Alexander, III et al. |
| 2003/0214400 | A1 | 11/2003 | Mizutani et al. |
| 2004/0263351 | A1 | 12/2004 | Joy et al. |
| 2005/0035854 | A1 | 2/2005 | Gupta et al. |
| 2005/0183143 | A1 | 8/2005 | Anderholm et al. |
| 2005/0288045 | A1 | 12/2005 | Yang et al. |
| 2006/0077053 | A1 | 4/2006 | Park et al. |
| 2006/0103528 | A1 | 5/2006 | Leyden |
| 2006/0154642 | A1 | 7/2006 | Scannell, Jr. |
| 2006/0155851 | A1 | 7/2006 | Ma et al. |
| 2006/0187032 | A1 | 8/2006 | Kunkel et al. |
| 2007/0085678 | A1 | 4/2007 | Joy et al. |
| 2007/0086578 | A1 | 4/2007 | Hansen et al. |
| 2007/0139183 | A1 | 6/2007 | Kates |
| 2007/0179730 | A1 | 8/2007 | Bornhoevd et al. |
| 2007/0222585 | A1 | 9/2007 | Sabol et al. |
| 2008/0034056 | A1 | 2/2008 | Renger et al. |
| 2008/0070546 | A1 | 3/2008 | Lee |
| 2008/0077436 | A1 | 3/2008 | Muradia |
| 2008/0147358 | A1 | 6/2008 | Kunkel et al. |
| 2009/0195379 | A1 | 8/2009 | Joy et al. |
| 2009/0203349 | A1 * | 8/2009 | Hollstien ............... G08B 25/10 340/539.11 |
| 2009/0222748 | A1 | 9/2009 | Lejeune et al. |
| 2009/0274104 | A1 | 11/2009 | Addy |
| 2009/0276503 | A1 | 11/2009 | Renger et al. |
| 2009/0278799 | A1 | 11/2009 | Wilson |
| 2010/0033331 | A1 | 2/2010 | Bautovich |
| 2010/0157061 | A1 | 6/2010 | Katsman et al. |
| 2010/0179856 | A1 | 7/2010 | Paretti et al. |
| 2010/0205061 | A1 | 8/2010 | Karmarkar |
| 2010/0279649 | A1 * | 11/2010 | Thomas ............... G06Q 10/10 455/404.2 |
| 2011/0014933 | A1 | 1/2011 | Karmarkar et al. |
| 2011/0074596 | A1 | 3/2011 | Frohlick et al. |
| 2011/0087677 | A1 * | 4/2011 | Yoshio ............... H04N 5/76 707/E17.059 |
| 2012/0330678 | A1 | 12/2012 | Kobylevsky et al. |
| 2013/0049987 | A1 | 2/2013 | Velusamy |
| 2013/0215266 | A1 | 8/2013 | Trundle et al. |
| 2013/0281138 | A1 | 10/2013 | Frohlick et al. |
| 2014/0031082 | A1 | 1/2014 | Zishaan |
| 2014/0152434 | A1 | 6/2014 | Frohlick et al. |
| 2014/0159891 | A1 | 6/2014 | Frohlick et al. |
| 2014/0162707 | A1 | 6/2014 | Frohlick et al. |
| 2016/0253898 | A1 | 9/2016 | Cobb et al. |
| 2017/0318447 | A1 | 11/2017 | Frohlick et al. |
| 2021/0118282 | A1 | 4/2021 | Frohlick et al. |

FOREIGN PATENT DOCUMENTS

| | | |
|---|---|---|
| CN | 101292273 | 10/2008 |
| CN | 101341521 | 1/2009 |
| EP | 1616237 A2 | 1/2006 |
| EP | 1816535 | 8/2007 |
| EP | 1616237 A4 | 12/2007 |
| JP | 05-327919 | 10/1993 |
| JP | H05327919 A | 12/1993 |
| JP | 08-273085 | 10/1996 |
| JP | H10188185 A | 7/1998 |
| JP | 2001-126173 | 5/2001 |
| JP | 2002-230654 | 8/2002 |
| JP | 2002-236988 | 8/2002 |
| JP | 2002312876 A | 10/2002 |
| JP | 2003-023678 | 1/2003 |
| JP | 2003316669 | 11/2003 |
| JP | 2003333584 A | 11/2003 |
| JP | 2005235230 A | 9/2005 |
| JP | 2008158786 A | 7/2008 |
| JP | 2008165336 | 7/2008 |
| JP | 2009020626 | 1/2009 |
| JP | 2009020628 A | 1/2009 |
| JP | 2009-027523 | 2/2009 |
| JP | 2009-146225 | 7/2009 |
| JP | 2009-176272 | 8/2009 |
| JP | 2009-198565 | 9/2009 |
| KR | 20090076292 A | 7/2009 |
| TW | 200947364 | 11/2009 |
| WO | 2004090679 | 10/2004 |
| WO | 2007035219 | 3/2007 |
| WO | 2011037715 | 3/2011 |

OTHER PUBLICATIONS

Tomozawa, "Proposal of Emergent Message Collecting System with Path Diversity," DICOMO 2008, vol. 2008, No. 1, [CD-ROM] IPSJ Symposium Series, Information Processing Society of Japan, Jul. 2, 2008, pp. 90-95, abstract only provided, 2 pages. [English translation of abstract included].

Japanese Patent Office, "Notice of Reasons for Refusal," issued in connection with Japanese Patent Application No. 2020-124848, dated Jul. 20, 2021, 4 pages. [English Translation Included].

Japanese Patent Office, "Decision to Grant a Patent," issued in connection with Japanese Patent Application No. 2020-124848, dated Oct. 18, 2022, 6 pages. [English Translation Included].

(56) References Cited

OTHER PUBLICATIONS

European Patent Office, "Communication Pursuant to Article 94(3) EPC", issued in connection with European Patent Application No. 19182424.2, dated Jun. 7, 2023, 5 pages.
International Searching Authority, "International Search Report and Written Opinion," issued in connection with International Patent Application No. PCT/US2010/046639, mailed Apr. 29, 2011, 7 pages.
Chinese Patent Office, "Office Action," issued in connection with Chinese Patent Application No. 201010294311.5, dated Jul. 16, 2012.
Japanese Patent Office, "Office Action," issued in connection with Japanese Patent Application No. 2012-527914, dated Sep. 24, 2013.
Japanese Patent Office, "Final Notification of Reason(s) for Refusal" issued in connection with Japanese Patent Application No. 2012-527914, dated Jul. 8, 2014, 6 pages.
Maekawa et al., "Implementing Object-Participation-Type Weblog in Sensor Network Environment," IPSJ SIG Technical Reports, Information Processing Society of Japan, vol. 2007, Issue 74, dated Jul. 20, 2007, 8 pages.
United States Patent and Trademark Office, "Non-Final Office Action," issued in connection with U.S. Appl. No. 13/925,491, on Jul. 18, 2014, 26 pages.
United States Patent and Trademark Office, "Non-Final Office Action," issued in connection with U.S. Appl. No. 14/145,760, on Sep. 22, 2014, 12 pages.
United States Patent and Trademark Office, "Non-Final Office Action," issued in connection with U.S. Appl. No. 14/145,773, on Oct. 9, 2014, 19 pages.
Chinese Patent Office, "Office Action," issued in connection with Chinese Patent Application No. 201310317050.8, dated Sep. 17, 2015, 15 pages.
Rana et al., "An Architecture for Mobile Social Networking Applications," IEEE First International Conference on Computational Intelligence, Communication Systems and Networks, Jul. 23, 2009, pp. 241-246.
Liu et al., "Adaptive Wireless Services for Augmented Environments," IEEE Sixth Annual International Conference on Mobile and Ubiquitous Systems: Networking and Services, Mobiquitious, Jul. 13, 2009, 8 pages.
United States Patent and Trademark Office, "Final Office Action," issued in connection with U.S. Appl. No. 14/145,760, on Feb. 6, 2015, 7 pages.
United States Patent and Trademark Office, "Final Office Action," issued in connection with U.S. Appl. No. 14/145,773, on Feb. 6, 2015, 7 pages.
Japanese Patent Office, "Office Action," issued in connection with Japanese Patent Application No. 2012-0527914, dated Mar. 24, 2015, 7 pages.
Maekawa et al., "Storing and Utilizing Lifelog by using Ubiquitous Sensors," IPSJ SIG Technical Reports, Information Processing Society of Japan, vol. 2008, Issue 110, 2008-UBI-20, Nov. 6, 2008, p. 45-52.
Japanese Patent Office, "Office Action," issued in connection with Japanese Patent Application No. 2012-527914, dated Mar. 1, 2016, 8 pages (includes English translation).
Chinese Patent Office, "Office Action," issued in connection with Chinese Patent Application No. 201310317050.8, dated Apr. 21, 2016, 25 pages (includes English translation).
Chinese State Intellectual Property Office (SIPO), "Third Chinese Office Action," issued in connection with Chinese Patent Application No. 201310317050.8, dated Nov. 1, 2016, 25 pages (includes English translation).
Chinese State Intellectual Property Office (SIPO), "Fourth Chinese Office Action," issued in connection with Chinese Patent Application No. 201310317050.8, dated Apr. 28, 2017, 18 pages (includes English translation).

Chinese State Intellectual Property Office (SIPO), "Fifth Chinese Office Action," issued in connection with Chinese Patent Application No. 201310317050.8, dated Nov. 6, 2017, 22 pages (includes English translation).
Japanese Patent Office, "Notice of Reason(s) for Rejection" issued in connection with Japanese Patent Application No. 2016-110240, dated Sep. 5, 2017, 5 pages (includes English translation).
European Patent Office, "Communication pursuant to Article 94(3) EPC," issued in connection with European Patent Application No. 10819212.1, dated Apr. 24, 2018, 4 pages.
European Patent Office, "Communication under Rule 71(3) EPC," issued in connection with European Patent Application No. 10819212.1-1215, dated Mar. 22, 2019, 36 pages.
United States Patent and Trademark Office, "Notice of Allowance," issued in connection with U.S. Appl. No. 15/488,369, on Apr. 23, 2018, 6 pages.
State Intellectual Property Office (SIPO) of the People's Republic of China, "Notification of the Reexamination," issued in connection with Chinese Patent Application No. 201310317050.8, on Aug. 23, 2018, 21 pages (includes English translation).
State Intellectual Property Office (SIPO) of the People's Republic of China, "Decision of Reexamination," issued in connection with Chinese Patent Application No. 201310317050.8, on Mar. 5, 2019, 17 pages.
Japanese Patent Office, "Decision to Refuse," issued in connection with Japanese Patent Application No. 2016-110240, dated Aug. 21, 2018, 6 pages (includes English translation).
United States Patent and Trademark Office, "Non-Final Office Action," issued in connection with U.S. Appl. No. 16/249,549, on Jul. 26, 2019, 12 pages.
European Patent Office, "Communication Under Rule 71(3) EPC," issued in connection with European Patent Application No. 10819212.1, on Sep. 2, 2019, 36 pages.
European Patent Office, "Supplementary European Search Report," issued in connection with European Patent Application No. 10819212.1, on Oct. 29, 2015, 8 pages.
United States Patent and Trademark Office, "Non-Final Office Action," issued in connection with U.S. Appl. No. 12/567,705, on Feb. 1, 2012, 13 pages.
United States Patent and Trademark Office, "Notice of Allowance and Fees(s) Due," issued in connection with U.S. Appl. No. 12/567,705, on Oct. 1, 2012, 7 pages.
United States Patent and Trademark Office, "Notice of Allowance and Fees(s) Due," issued in connection with U.S. Appl. No. 12/567,705, on Feb. 25, 2013, 7 pages.
United States Patent and Trademark Office, "Non-Final Office Action," issued in connection with U.S. Appl. No. 13/925,491, on Jul. 18, 2014, 13 pages.
United States Patent and Trademark Office, "Notice of Allowance and Fee(s) Due," issued in connection with U.S. Appl. No. 13/925,491, on Nov. 28, 2014, 7 pages.
United States Patent and Trademark Office, "Non-Final Office Action," issued in connection with U.S. Appl. No. 14/145,748, on Sep. 24, 2014, 10 pages.
United States Patent and Trademark Office, "Final Office Action," issued in connection with U.S. Appl. No. 14/145,748, on Mar. 18, 2015, 10 pages.
United States Patent and Trademark Office, "Advisory Action," issued in connection with U.S. Appl. No. 14/145,748, on May 29, 2015, 3 pages.
United States Patent and Trademark Office, "Non-Final Office Action," issued in connection with U.S. Appl. No. 14/145,748, on May 26, 2016, 9 pages.
United States Patent and Trademark Office, "Final Office Action," issued in connection with U.S. Appl. No. 14/145,748, on Oct. 24, 2016, 6 pages.
United States Patent and Trademark Office, "Notice of Allowance and Fee(s) Due," issued in connection with U.S. Appl. No. 14/145,748, on Jan. 22, 2016, 8 pages.
United States Patent and Trademark Office, "Notice of Allowance and Fee(s) Due," issued in connection with U.S. Appl. No. 14/145,748, on Dec. 29, 2016, 7 pages.

(56) References Cited

OTHER PUBLICATIONS

United States Patent and Trademark Office, "Non-Final Office Action," issued in connection with U.S. Appl. No. 15/488,369, on Oct. 5, 2017, 6 pages.
United States Patent and Trademark Office, "Final Office Action," issued in connection with U.S. Appl. No. 15/488,369, on Mar. 12, 2018, 7 pages.
United States Patent and Trademark Office, "Notice of Allowance and Fee(s) Due," issued in connection with U.S. Appl. No. 15/488,369, on Apr. 23, 2018, 9 pages.
United States Patent and Trademark Office, "Supplemental Notice of Allowability," issued in connection with U.S. Appl. No. 15/488,369, on May 24, 2018, 2 pages.
International Searching Authority, "International Preliminary Report on Patentability," issued in connection with International Application No. PCT/US2010/046639, on Apr. 5, 2012, 6 pages.
European Patent Office, "Extended European Search Report," issued in connection with European Patent Application No. 1918242.2, on Oct. 2, 2019, 9 pages.
United States Patent and Trademark Office, "Non-Final Office Action," issued in connection with U.S. Appl. No. 16/114,166, on May 10, 2019, 11 pages.
United States Patent and Trademark Office, "Notice of Allowance," issued in connection with U.S. Appl. No. 16/114,166, on Oct. 4, 2019, 7 pages.
United States Patent and Trademark Office, "Notice of Allowance," issued in connection with U.S. Appl. No. 14/145,760, on Oct. 7, 2015, 8 pages.
United States Patent and Trademark Office, "Supplemental Notice of Allowability," issued in connection with U.S. Appl. No. 14/145,760, on Oct. 29, 2015, 2 pages.
United States Patent and Trademark Office, "Supplemental Notice of Allowability," issued in connection with U.S. Appl. No. 14/145,760, on Dec. 9, 2015, 2 pages.
United States Patent and Trademark Office, "Non-Final Office Action," issued in connection with U.S. Appl. No. 14/145,773 on Nov. 24, 2015, 11 pages.
United States Patent and Trademark Office, "Notice of Allowance," issued in connection with U.S. Appl. No. 14/145,773, on Apr. 21, 2016, 7 pages.
United States Patent and Trademark Office, "Supplemental Notice of Allowability," issued in connection with U.S. Appl. No. 14/145,773, on May 5, 2016, 2 pages.
United States Patent and Trademark Office, "Supplemental Notice of Allowability," issued in connection with U.S. Appl. No. 14/145,773, on May 6, 2016, 2 pages.
United States Patent and Trademark Office, "Supplemental Notice of Allowability," issued in connection with U.S. Appl. No. 14/145,773, on May 18, 2016, 2 pages.
Japanese Patent Office, "Office Action," issued in connection with Japanese Patent Application No. JP2018-239797, on Nov. 5, 2019, 7 pages (includes English translation).
Japanese Patent Office, "Appeal Decision," issued in connection with Japanese Patent Application No. JP2016-110240, on Oct. 8, 2019, 32 pages (includes English translation).
United States Patent and Trademark Office, "Final Office Action," issued in connection with U.S. Appl. No. 16/249,549, on Jan. 7, 2020, 15 pages.
Japanese Patent Office, "Office Action," issued in connection with Japanese Patent Application No. JP2018-239797, on Nov. 5, 2019, 7 pages.
United States Patent and Trademark Office, "Non-Final Office Action," issued in connection with U.S. Appl. No. 16/249,549, on Apr. 28, 2020, 11 pages.
Japanese Patent Office, "Final Rejection," issued in connection with Japanese Patent Application No. JP2018-239797, dated Mar. 24, 2020, 6 pages.
European Patent Office, "Communication Pursuant to Article 94(3) EPC," issued in connection with European Patent Application No. 19182424.2, dated Oct. 2, 2020, 6 pages.
European Patent Office, "Communication pursuant to Article 94 EPC," issued in connection with European Patent Application No. 19182424.2, dated Apr. 23, 2021, 5 pages.
United States Patent and Trademark Office, "Notice of Allowance," issued in connection with U.S. Appl. No. 16/249,549, dated Nov. 30, 2020, 3 pages.
United States Patent and Trademark Office, "Corrected Notice of Allowance," issued in connection with U.S. Appl. No. 16/249,549, dated Sep. 23, 2020, 5 pages.
United States Patent and Trademark Office, "Notice of Allowance," issued in connection with U.S. Appl. No. 16/249,549, dated Sep. 14, 2020, 8 pages.
United States Patent and Trademark Office, "Notice of Allowance," issued in connection with U.S. Appl. No. 16/114,166, dated Jan. 21, 2020, 2 pages.
United States Patent and Trademark Office, "Notice of Allowance," issued in connection with U.S. Appl. No. 16/114,166, dated Dec. 19, 2019, 2 pages.
European Patent Office, "Decision to Grant a European patent pursuant to Article 97(1) EPC," issued in connection with European Application No. 10819212.1, dated Jan. 16, 2020, 2 pages.
Japanese Patent Office, "Notice of Reasons for Refusal," issued in connection with Japanese Patent Application No. 2020-124848, dated Mar. 15, 2022, 5 pages (includes English translation).
Maekawa et al., "Implementing Object-Participation-Type Weblog in Sensor Network Environment," SIG Technical Reports, Jul. 20, 2007, pp. 47-52, 6 pages (includes English abstract).
United States Patent and Trademark Office, "Non-Final Office Action," issued in connection with U.S. Appl. No. 17/134,275, on Aug. 23, 2021, 11 pages.
United States Patent and Trademark Office, "Final Office Action," issued in connection with U.S. Appl. No. 17/134,275, on Mar. 11, 2022, 6 pages.
United States Patent and Trademark Office, "Notice of Allowance and Fee(s) Due," issued in connection with U.S. Appl. No. 17/134,275, on Jun. 29, 2022, 7 pages.
NPL search.pdf (Aug. 18, 2021), 2 pages.

* cited by examiner

METHODS AND ARRANGEMENTS FOR SENSORS

RELATED APPLICATIONS

This patent is a continuation of U.S. patent application Ser. No. 17/134,275, now U.S. Pat. No. 11,488,465, filed Dec. 26, 2020, entitled "Methods and Arrangements for Smart Sensors," which is a continuation of U.S. patent application Ser. No. 16/249,549, now U.S. Pat. No. 10,902,715, filed Jan. 16, 2019, entitled "Methods and Arrangements for Smart Sensors," which is a continuation of U.S. patent application Ser. No. 16/114,166, filed Aug. 27, 2018, now U.S. Pat. No. 10,567,928, entitled "Methods and Arrangements for Smart Sensors," which is a continuation of U.S. patent application Ser. No. 15/488,369, filed Apr. 14, 2017, now U.S. Pat. No. 10,064,027, entitled "Methods and Arrangements for Smart Sensors," which is a continuation of U.S. patent application Ser. No. 14/145,748, filed Dec. 31, 2013, now U.S. Pat. No. 9,648,476, entitled "Methods and Arrangements for Smart Sensors," which is a continuation of U.S. patent application Ser. No. 13/925,491, filed Jun. 24, 2013, now U.S. Pat. No. 8,957,776, entitled "Methods and Arrangements for Smart Sensors," which is a continuation of U.S. patent application Ser. No. 12/567,705, filed Sep. 25, 2009, now U.S. Pat. No. 8,471,707, entitled "Methods and Arrangements for Smart Sensors." U.S. patent application Ser. No. 17/134,275, U.S. patent application Ser. No. 16/249,549, U.S. patent application Ser. No. 16/114,166, U.S. patent application Ser. No. 15/488,369, U.S. patent application Ser. No. 14/145,748, U.S. patent application Ser. No. 13/925,491, and U.S. patent application Ser. No. 12/567,705 are hereby incorporated herein by reference in their entireties.

BACKGROUND

The present disclosure relates generally to sensor technologies. More particularly, the present disclosure relates to sensors coupled with logic to transmit sensor related events through one or more messaging systems to users.

DETAILED DESCRIPTION

Figure 1:
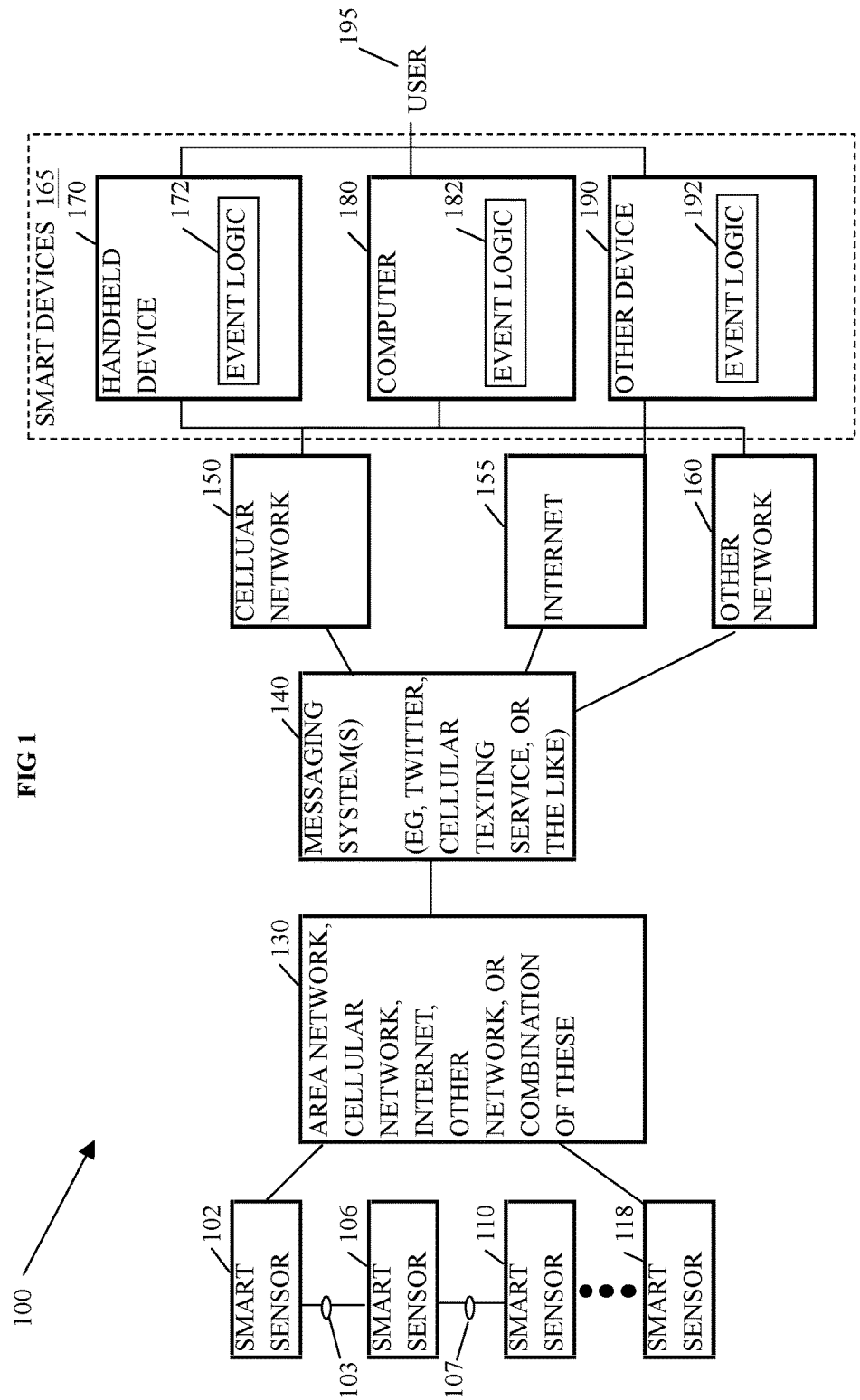
FIG. 1 depicts an embodiment of a system comprising smart sensors coupled with the Internet to communicate with a user.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, smart sensors, logic to process messages from smart sensors, and smart sensor systems are described herein. Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality. Embodiments may comprise logic such as hardware and/or code to communicate events as messages via a messaging system to post the messages to one or more messaging accounts. The messaging system may be a texting service like twitter that captures the messages and then re-broadcasts the messages, e.g., immediately as a tweet or a cellular text message. In some embodiments, the smart sensor comprises a communications module with a Twitter™ application program interface (API) on a communications platform with a software/hardware framework to interconnect with one or more pluggable monitors with sensors and/or wireless monitors with sensors. In other embodiments, the communications module may be integrated with one or more monitors.

Some embodiments comprise a smart-device to receive events from the sensors and to communicate the events to the user. Many of these embodiments comprise event logic such as hardware and/or code to allow any device to become a smart-device that can provide status updates and event notifications to a user based upon events identified by a smart sensor and/or custom events identified by event logic comprising a combination of related events identified by a smart sensor such as events occurring within a time period. Such embodiments may comprise, for example, logic to monitor one or more messaging systems for messages identifying the event. In some embodiments, the event logic may track the status or changes in status of one or more smart sensors. Such tracking provides the user with the ability to follow updates of information important to them (e.g. whether or not the pets need food, plants need water, light bulbs need to be replaced, appliances such as refrigerators need maintenance, security perimeters have a breach, etc.).

In other embodiments, standard messaging system software on a smart-device may be sufficient to monitor events communicated from smart sensors. For instance, a smart sensor may monitor the moisture content of potting soil for a plant. The smart sensor may be configured to identify as periodic events, periodic updates of the moisture content and to identify as an event, the moisture falling below a specified threshold moisture level. In one embodiment, monitor logic of the smart sensor may periodically capture the moisture level of the soil, generate a text message including the moisture level, log into a Twitter™ account via a local network's connection to the Internet, and transmit the message as a tweet to the Twitter™ account. The user may have a device such as a mobile or handheld device that monitors the Twitter™ account and may receive the message with the moisture level, which includes the name assigned to the smart sensor as well as the moisture level reading. If the moisture level of the soil falls below the specified threshold, the monitor logic may generate a message indicating the change and transmit the message to the Twitter™ account, informing the user that the moisture level fell below the threshold moisture level for the soil.

In other embodiments, the smart sensor may be configured to identify an event when the rate of moisture loss in the potting soil increases beyond a specified threshold. For example, if the ambient temperature and humidity for the plant changes significantly, the sensor may inform the user that the watering rate should be modified. In further embodiments, a smart sensor coupled with the watering system for the plant may monitor the messaging system for a message from the smart sensor for the plant and modify the watering rate in response to the message from the smart sensor for the plant. The smart sensor for the watering system may then generate a message for the user to indicate that the watering rate has been modified and, in some embodiments, the smart sensor for the watering system may include in the message, information such as the watering rate and/or the change in the watering rate.

Embodiments may facilitate wireless communications. Wireless embodiments may integrate low power wireless communications like Bluetooth®, wireless local area networks (WLANs), wireless metropolitan area networks (WMANs), wireless personal area networks (WPAN), cellular networks, and/or Institute of Electrical and Electronic Engineers (IEEE) standard 802.15.4, "Wireless Medium Access Control (MAC) and Physical Layer (PHY) Specifications for Low Rate Wireless Personal Area Networks (LR-WPANs)" (2006) (http://standards.ieee.org/getieee802/download/802.15.4-2006.pdf), communications in the smart sensors, networks, messaging systems, and smart-devices to facilitate interaction between such devices.

Furthermore, some wireless embodiments may incorporate a single antenna while other embodiments may employ multiple antennas. For instance, multiple-input and multiple-output (MIMO) is the use of multiple antennas at both the transmitter and receiver to improve communication performance. MIMO technology offers significant increases in data throughput and link range without additional bandwidth or transmit power. It achieves this by higher spectral efficiency (more bits per second per hertz of bandwidth) and link reliability or diversity (reduced fading).

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a system 100 comprising one or more smart sensors 102, 106, 110, and 118, coupled with a cellular network 150, the Internet 155, and another network 160, to communicate with a user 195 via smart devices 165. System 100 may read sensor signals from the one or more sensors 102, 106, 110, and 118 to determine sensor data, process the sensor data to detect sensor events, process the sensor events to select one or more messages associated with the sensor events, and interact with one or more messaging systems 140 via a messaging account to post the one or more messages to the messaging account. For example, smart sensor 102 may read an analog sensor signal and convert the sensor signal from the analog signal to a digital value. In some embodiments, smart sensor 102 may comprise memory to store the digital value or data representative of the digital value. In other embodiments, smart sensor 102 may comprise a sensor that produces a digital output.

By comparing the digital value of the sensor signal to a list of values, smart sensor 102 may determine that the value reaches or surpasses a threshold value for the sensor signal, indicating that the sensor signal represents a signal event. In some embodiments, smart sensor 102 may detect a sensor event based upon the analog sensor signal rather than a digital value representative of the analog signal. In further embodiments, smart sensor 102 may detect a sensor event based upon a change in the sensor signal. Smart sensor 102 may detect the change by a sensor sensitive to change and the threshold value may be inherent to the sensor's ability to detect a change in the sensor signal has occurred.

Smart sensors such as smart sensor 102 may comprise a processor, a chipset, a transmitter/receiver, and the memory. The processor may receive and execute code from the memory via the chipset to perform functions attributed herein to the smart sensor. The processor may comprise, for instance, one or more Intel® Atom™ processors and the chipset may comprise, for instance, an Intel® 945GC Express Chipset or a Mobile Intel® 945GSE Express Chipset. In other embodiments, smart sensors may comprise microcontrollers or state machines to accomplish functionality of the smart sensors.

Smart sensors 102, 106, 110, and 118 may periodically read the sensor signal, may continuously read the sensor signal, may read the sensor signal in response to a command received from another smart sensor or device or a command received from a user, or may read the sensor signal in response to another input such as a change in state of the sensor signal or another signal. For instance, smart sensor 102 may comprise more than one sensors and activity or a change in state of a first sensor may initiate reading of a second sensor to detect a sensor event.

Upon detecting a sensor event, smart sensor 102 may process the sensor event to select a message associated with the sensor event. Processing the sensor event may select a message from a list or table of messages associated with sensor events. In some embodiments, there is only one message and processing the sensor event to select the message involves selecting the message in response to detecting the sensor event. In some embodiments, smart sensor 102 may modify or add to the message to include a representation of the sensor signal. For instance, smart sensor 102 may select a message associated with a range of digital values for a sensor signal and may include the digital value, or a representation thereof in text of the message. In several embodiments, smart sensor 102 may add the digital value for the sensor signal as metadata to the message. In further embodiments, the messages may be selected based upon the messaging system through which the message is to be transmitted to the user 195.

Smart sensor 102 may select a text message associated with the sensor signal from memory of smart sensor 102. The message may be a text message in some embodiments and another media message in other embodiments. Several embodiments include multimedia messages. For example, smart sensor 102 may detect that a light bulb is out via a photosensitive sensor, a current-sensitive sensor, and/or a voltage-sensitive sensor. Smart sensor 102 may detect a change in a current generated by a photosensitive sensor and select a text message: "The light bulb in the utility room should be replaced." A communications module of smart sensor 102 may then interact with a network 130 to transmit the text message to messaging system(s) 140.

In system 100, smart sensor 102 couples with smart sensor 106 via communications channel 103 and smart sensor 110 via communications channels 103 and 107. In this embodiment, smart sensor 102 is a master smart sensor and smart sensors 106 and 110 are slave smart sensors. The master smart sensor 102 may comprise a monitor interface to receive communications from slave smart sensors 106 and 110 to coordinate communications transmitted via network 130. In some embodiments, smart sensors 106 and 107 may read their respective sensor signals from in response to a command from smart sensor 102 via monitor interfaces on smart sensors 106 and 110. In other embodiments, smart sensors 106 and 110 may detect signal events independently and transmit indications of sensor events to smart sensor 102. Smart sensor 102 may comprise aggregation logic to combine sensor events from smart sensors 102, 106, and 110 to select a message. In still other embodiments, smart sensors 106 and 110 may detect sensor events, select messages based upon the sensor events, and transmit the messages to smart sensor 102 via communications channels 103 and 107. In such embodiments, smart sensor 102 may respond by transmitting the messages to messaging systems 140 or may coordinate transmission of the messages with transmission of a message from more than one smart sensors or from all the smart sensors 102, 106, and 110. In the latter embodiments, aggregation logic may combine messages from the smart sensors 102, 106, and 110 into a single transmission.

Communications channels 103 and 107 may be cables to transmit electrical signals and/or optical signals, or may comprise wireless communications mediums. Remote communication between smart sensors 102, 106, and 110 or between smart sensor 102 or 118 and network 130 may be accomplished via wireless communication formats. Wireless embodiments may integrate low power wireless communications like Bluetooth® and/or Institute of Electrical and Electronic Engineers (IEEE) standard 802.15.4 communications in the smart sensors 102, 106, 110, and 118. The standard, IEEE 802.15.4™, provides for low-data-rate connectivity among relatively simple devices that consume minimal power and typically connect at distances of 10 meters (30 feet) or less. IEEE 802.15.4™, addresses fixed, portable and moving devices that operate at data rates of 10 to 250 kbps. The standard allows devices to form short-range ad hoc networks within which they can interact directly.

Network 130 may be responsive to one or more smart sensors 102, 106, 110, and 118 to communicate with the smart sensors and one or more messaging systems 140. Network 130 may comprise a local area network (LAN), wide area network (WAN), metropolitan area network (MAN), cellular network, intranet, Internet, another such network or a combination of more than one of these networks to establish communications between the smart sensors 102, 106, 110, and 118 and messaging system(s) 140. Communications between the network 130 and messaging system(s) 140 may be physical or wireless or a combination thereof.

Messaging system(s) 140 may comprise multiple messaging accounts and the smart sensors such as smart sensor 102 may interact with messaging system(s) 140 to access one or messaging accounts for one or more of the messaging system(s) 140 and to post one or more messages to the one or more messaging accounts of the one or more messaging system(s) 140. For instance, smart sensor 102 may comprise a security sensor to detect a breach of a security perimeter. Smart sensor 102 may receive a sensor signal indicating, for instance, that a door is not fully closed and monitor logic of smart sensor 102 may determine that a sensor event has occurred because the alarm is set. In response, smart sensor 102 may associate this sensor event with a text message stating: "The garage door has been breached while the alarm was set." Smart sensor 102 may interact with a local area network to access the Internet, network 130, and access a Twitter™ web site, messaging system(s) 140, via the Internet to post the text message to a Twitter™ account, which is a messaging account. Smart sensor 102 may either transmit authentication to access the Twitter™ account along with the message to post the message to the account or may interact with the Twitter™ web site to authenticate smart sensor 102 as an authorized user of the Twitter™ account via a Twitter™ application program interface (API) of smart sensor 102. Posting the message to the Twitter™ account may allow the user 195 to receive the message on one or more smart devices 165 via a cellular network, the Internet 155, and/or another network 160. In further embodiments, smart sensor 102 may post the message for the security breach to more than one Twitter™ accounts to notify user 195 and possibly one or more other user such as each member in a family so they are aware of the security breach. In still further embodiments, in addition to posting to multiple Twitter™ accounts, smart sensor 102 may post to multiple cellular phone texting services and/or other messaging system(s) 140.

In some embodiments, smart sensor 102 may comprise metadata logic to attach metadata to the text message or transmit the metadata along with the text message. For instance, smart sensor 102 may also comprise a digital image-capturing device that may periodically capture an image of the garage door or may capture an image of the garage door in response to detection of a signal event such as detection of contacts for the garage door being separated while the alarm system is armed or set. In such embodiments, smart sensor 102 may attach the captured digital image of the garage door as metadata to the text message "The garage door has been breached while the alarm was armed" and send the message to the user via one or more messaging system(s) 140. If the primary system does not facilitate the metadata, a communication module of smart sensor 102 may send the text message via the primary messaging system and the text message with the digital image of the garage door via another messaging system such as an email account or as a multimedia message via a cellular network. The multimedia messaging system of the cellular network may then transmit the multimedia message through cellular network 150 to a handheld device 170 of the user 195.

Smart devices 165 may comprise a Nettop, a Netbook, a cellular phone, a personal data assistant (PDA), a laptop, a mobile Internet device (MID), or the like or a non-mobile or less than mobile device such as a desktop computer, a game console, a digital video recorder/cable box, a server, and the like. FIG. 1 illustrates smart devices 165 with three types of devices comprising handheld device 170, computer 180, and other device 190. Handheld device 170 may comprise a mobile phone, a PDA, or the like with event logic 172. Event logic 172 may receive one or more messages from a smart sensor such as smart sensor 118 via messaging system(s) 140. For instance, user 195 may receive a text message or a multimedia message via cellular network 150 from smart sensor 118 indicating that a water-sensitive plant in the green house needs to be watered. Smart sensor 118 may comprise a moisture level sensor that monitors the moisture level of a water-sensitive plant in the green house and may transmit a text message to user 195 via network 130, an Internet interface to cellular network 150, and cellular network 150 when the moisture falls below a threshold value that is either set by user 195 or is a default setting of smart sensor 118.

In response to the message from smart sensor 118, user 195 may respond with a text message, "Water the water-sensitive plant in the green house". A command receiver logic of smart sensor 118 may monitor for a text message from user 195 and may receive the text message, "Water the water-sensitive plant in the green house". Monitor logic of smart sensor 118 may receive the text message and interpret the text message as a command to water the plant. In response, smart sensor 118 may instruct an action execution module of smart sensor 118 to water the plant and the action execution module may send a command to a watering system to initiate a predetermined watering session for the water-sensitive plant.

Event logic 172, 182, and 192 may comprise standard logic integrated into these devices to access messaging system(s) 140 in some embodiments. In other embodiments, event logic 172, 182, and 192 may comprise hardware and/or code to facilitate transmission of messages from smart sensors 102, 106, 110, and 118 through messaging system(s) 140 to user 195. Many of these embodiments comprise event logic to allow any device to become a smart-device 165 that can provide status updates and event notifications to user 195 based upon events identified by smart sensors 102, 106, 110, and 118, and/or custom events identified by event logic 172, 182, and 192 comprising a combination of related events identified by one or more smart sensors 102, 106, 110, and 118 such as events occurring within a time period. Such embodiments may comprise, for example, logic to monitor one or more messaging systems for messages identifying the event. In some embodiments, event logic 172, 182, and 192 may track the status or changes in status of one or more smart sensors 102, 106, 110, and 118. Such tracking provides the user 195 with the ability to follow updates of information important to them (e.g. whether or not the pets need food, plants need water, light bulbs need to be replaced, appliances such as refrigerators need maintenance, security perimeters have a breach, etc.)

Figure 2:
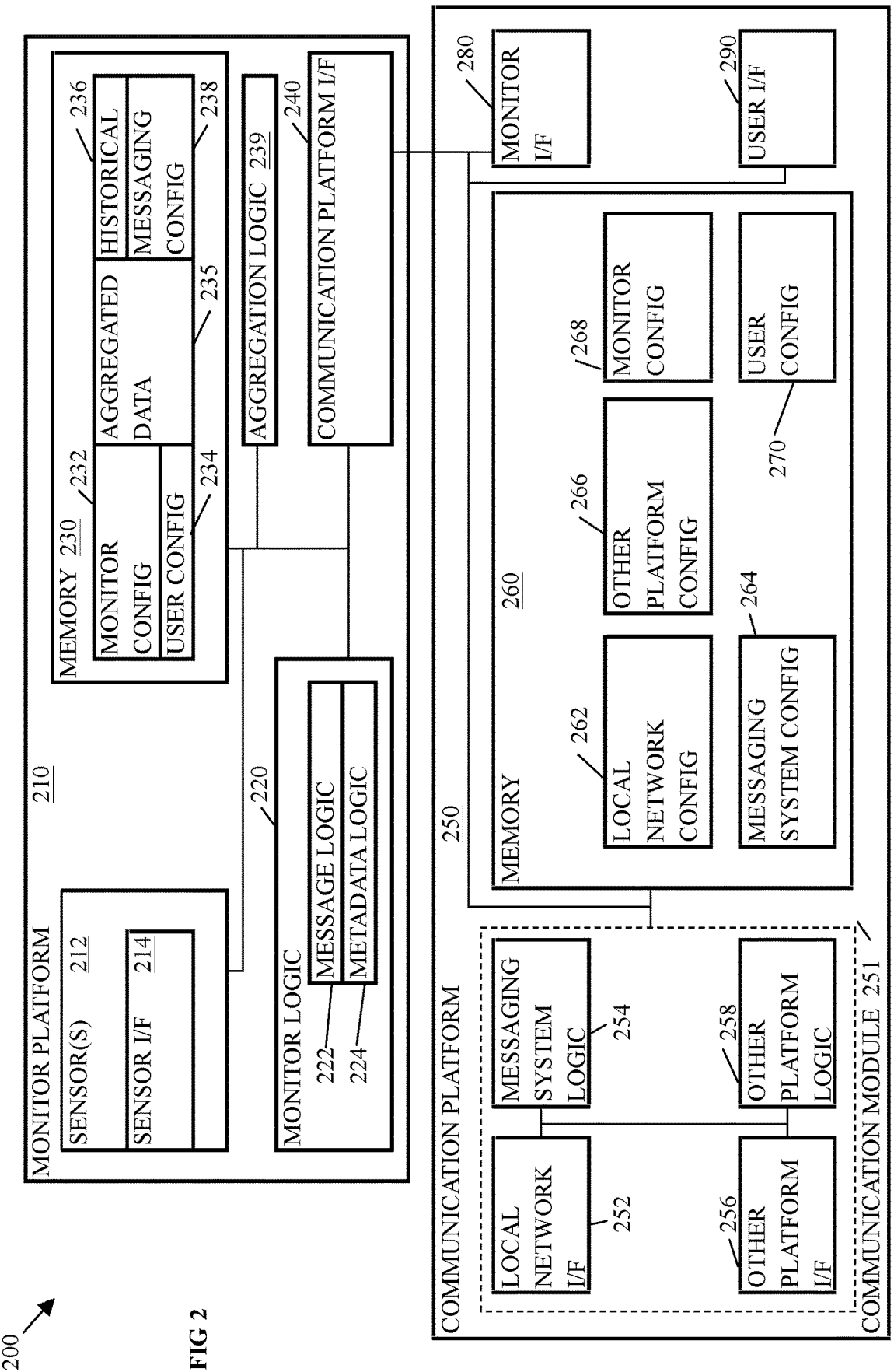
FIG. 2 depicts an embodiment of a smart sensor comprising a monitor coupled with a communication module.

FIG. 2 depicts an embodiment of a smart sensor 200 comprising a monitor platform 210 coupled with a communication platform 250. Monitor platform 210 comprises a platform with one or more sensors and logic to read the one or more sensors, detect a sensor event, and select a message based upon the sensor event. In some embodiments, monitor platform 210 may also comprise messaging system logic 254 such as an API to establish communications with one or more messaging accounts and transmit the message to the one or more messaging accounts via communications platform 250. In the present embodiment, monitor platform 210 transmits the one or more messages to the communications module 251 via communications platform interface 240 and communications module 251 comprises messaging system logic 254 to receive the one or more messages and interact with one or more messaging systems to post the message to one or more messaging accounts.

Monitor platform 210 comprises sensors 212, sensor interface 214, monitor logic 220, memory 230, aggregation logic 239, and communication platform interface 240. Sensors 212 and sensor interface 214 produce sensor signals based upon an event that the user decides to monitor. For instance, a user may decide to monitor whether or not the pets need food, plants need water, light bulbs need to be replaced, appliances such as refrigerators need maintenance, security perimeters have a breach, etc. Sensors 212 may comprise sensors on the monitor platform 210 and sensor interface 214 may couple with sensors located some distance away from monitor platform 210. For example, a sensor for a refrigerator may be located on monitor platform 210 and monitor platform 210 may be coupled with the refrigerator. On the other hand, a sensor to determine whether a plant should be watered may be in the soil for the plant and the monitor platform 210 may be attached to the planter or to a wall near the plant.

In some embodiments, sensor interface 214 may couple with remote sensors wirelessly. In other embodiments, sensor interface 214 may couple with remote sensors via a physical connection such as a tube, a wire, or an optic filament. In further embodiments, sensor interface 214 may be capable of coupling with remote sensors physically or wirelessly.

Monitor logic 220 may read the sensor signal, detect a sensor event based upon the sensor signal, select a message based upon the sensor event, and communicate the message to communications platform 250. Monitor logic 220 may determine which sensor readings are sensor events, the timing of sensor readings, the name of the sensor to uniquely or clearly identify the sensor to the user in a message generated for the sensor events from the sensor, calculations to perform to detect a sensor event, or the like from monitor configuration 232 of memory 260. In many embodiments, such settings may be default and some settings may not be configurable.

In some embodiments, monitor logic 220 may determine whether a sensor signal represents a sensor event based upon a calculation. The calculation may comprise the sensor signal, and part or all of the historical data for the sensor and/or other sensors. In several embodiments, the calculation may comprise aggregated data 235, which includes data from other monitor platforms or includes data based upon sensor signals read by other monitor platforms. For example, monitor platform 210 may be attached to the motherboard of an alarm system to monitor whether or not the alarm is armed. A second monitor may comprise a glass breakage sensor for the alarm system. If the alarm is armed, and the glass breakage sensor changes state, the second monitor platform may transmit an indication of the sensor event to monitor platform 210 via aggregation logic 239 and aggregation logic 239 may store the indication of the sensor event in aggregation memory. In some embodiments, the indication of the sensor event may also include metadata such as an image capture from the room of the glass breakage detector, which may also be stored in aggregation data 235. Monitor logic 220 may determine that the combination of the glass breakage sensor event and the alarm being armed is a sensor event.

In other embodiments, monitor logic 220 may calculate a threshold value at which a sensor event occurs. For example, monitor logic 220 may, based upon default calculations indicated in monitor configuration 232 or user-defined calculations indicated in user configuration 234, calculate, e.g., a rate of change of a water level in a pet's bowl to determine at what water level (the threshold value) the user should be alerted to refill a water dispenser connected to the pet's bowl. The calculation may involve heuristic sensor data of historical 236 related to rate at which the water level changes, the maximum rate at which the water level changes (e.g., when the pet is drinking the water), as well as the minimum rate at which the water level changes over time such as the evaporation rate of water, which is based upon the temperature and humidity level of the environment about the pet's water bowl. Furthermore, reaching a minimum threshold for the water level may cause monitor logic 220 to generate a message and transmit the message to the user regardless of the calculations.

Monitor logic 220 may comprise message logic 222 and metadata logic 224. Message logic 222 may select a message from one or more messages in messaging configuration 238 of memory 230 based upon the sensor event. For instance, message logic 222 may compare a digital value representative of the sensor signal against messages in messaging configuration 238 to determine which message to associate with the sensor event.

In some embodiments, messaging logic 222 may also determine which message to associate with the sensor event based upon the particular sensor from which the sensor signal is derived, a calculation related to the sensor event, the occurrence of another sensor event, or the like. For example, if sensors 212 comprise a first sensor and a second sensor, messaging configuration 238 may comprise a list or table of messages specifically for the first sensor and a list or table of messages for the second sensor. In further embodiments, messaging configuration 238 may comprise different messages for remote sensors and local sensors and/or different messages for different messaging systems. In several embodiments, the list of messages as well as whether the messages differ between different sensors 212 and/or between local and remote sensors may be configurable by a user and stored in user configuration 234. In such embodiments, monitor logic 220 may access user configuration 234 and messaging configuration 238 to select a message based upon a sensor event.

Metadata logic 224 may comprise hardware and/or code to determine metadata to attach to a message selected by messaging logic 222. Metadata logic 224 may attach historical data from historical 236, aggregated data 235, a digital value for the sensor signal, data from other sensors or monitor platforms, or the like. In some embodiments, metadata logic 224 attaches multimedia files to messages. Such files may include audio recordings, video recordings, image files, or the like either from files provided by a user in memory 230 or collected from other sensors or monitor platforms.

Memory 230 may comprise one or more types of memory including volatile memory and non-volatile memory such as random access memory, read only memory, flash memory, hard drive storage, or other data storage media.

Note that logic and interfaces of monitor platform 210 are illustrated separately due to their distinct functionality but these may be performed by code executing on the same or different processors or processor cores, code executing in different threads of the same processor or processor core, signals processed via different logical paths of the same state machine or via different state machines, or the like. This is also true about communications platform 250 as well as logic, modules, and interfaces of other FIGS.

Communications platform 250 comprises a universal platform for multiple types of monitor platforms such as monitor platform 210. Communications platform 250 comprises a monitor interface 280 to couple physically or wirelessly with one or more monitor platforms such as monitor platform 210. In some embodiments, monitor interface 280 may be capable of coupling with multiple monitors physically, wirelessly, or both substantially simultaneously.

Communications platform 250 may couple with communication platform interface 240 to communicate a message associated with a sensor event detected by monitor platform 210 to a communication module 251. Communications platform 250 may comprise communications module 251, memory 260, monitor interface 280, and user interface 290. Communication module 251 may couple with exterior networks to interact with a messaging system to post a message related to a sensor event in a messaging account.

Communication module 251 may comprise local network interface 252, messaging system logic 254, other platform interface 256, and other platform logic 258. Local network interface 252 may comprise a physical and/or wireless interface to couple with a local network such as a corporate intranet or a LAN. Local network interface 252 may transmit authentication data from local network configuration 262 of memory 260 to the local network to establish a communications channel with the Internet via the local network and to facilitate communications from messaging system logic 254 to access a messaging system such as Twitter™.

Messaging system logic 254 may utilize messaging system configuration 264 of memory 260 to log into a messaging account such as a Twitter™ account to post a message related to a sensor event. In some embodiments, messaging system logic 254 may comprise a Twitter™ API. In other embodiments, messaging system logic 254 may be configured to access a Twitter™ account via a Twitter™ API stored in messaging system configuration 264. In further embodiments, messaging system logic 254 may access a texting service for a cellular phone network via local network interface 252 to transmit the message.

Other platform interface 256 may comprise an interface for another network such as a phone network, an alternative data network, a cellular network, or the like to facilitate transmission of the message via the same messaging system as messaging system logic 254 or an alternative messaging system. For instance, the messaging system may be Internet-based so local network interface 252 may access the Internet via a cable-based Internet service and other platform interface 256 may access the Internet through a telephone line-based Internet service and other platform configuration 266 of memory 260 may provide the alternate security information and protocols to access the Internet through the telephone line-based Internet service.

Other platform logic 258 may offer an alternative messaging system access to that of messaging system logic 254. For instance, the messaging system accessed by other platform logic 258 may facilitate posting a message via two different services, posting a message via an alternate service if a primary service is unavailable, posting via an alternate service depending upon a priority level associated with a message, posting via an alternate service to balance a load through the messaging systems, another user-defined reason for using the alternate messaging system, or a combination of reasons.

Monitor interface 280 may couple with at least one monitor platform to receive a message from the monitor platform associated with a sensor event detected by the corresponding monitor logic such as monitor logic 220. In some embodiments, when multiple monitor platforms couple with monitor interface 280, monitor interface 280 may direct messages from any of the platforms to communication module 251 to post to a messaging account. In several embodiments, monitor configuration 268 of memory 260 may include data to determine whether the message should be posted or forwarded to aggregation logic 239 of monitor platform 210.

User interface 290 may be a physical or wireless interface to interconnect with a user to provide user configurations for the communications platform 250 and, in some embodiments, for the monitor platform 210. In other embodiments, the user interface for the monitor configurations may be part of the monitor platform. For instance, user interface 290 may comprise a universal serial bus (USB) connector, a firewire bus connector, an optical bus connector, or another type of bus connector. User interface 290 may interact with a user to determine user-definable settings and to store the user-definable settings in user configuration 270 of memory 260.

In some embodiments, user interface configuration 270 may include code to request and set user configurations for the user. In other embodiments, user interface 290 may be capable of executing code such as an extensible markup language (XML) code to request and set user configurations. In some embodiments, XML code for user configuration of a monitor platform such as monitor platform 210 may reside in memory of monitor platform 210 and be accessible to user interface 290 for setting the user-definable settings.

Figure 3:
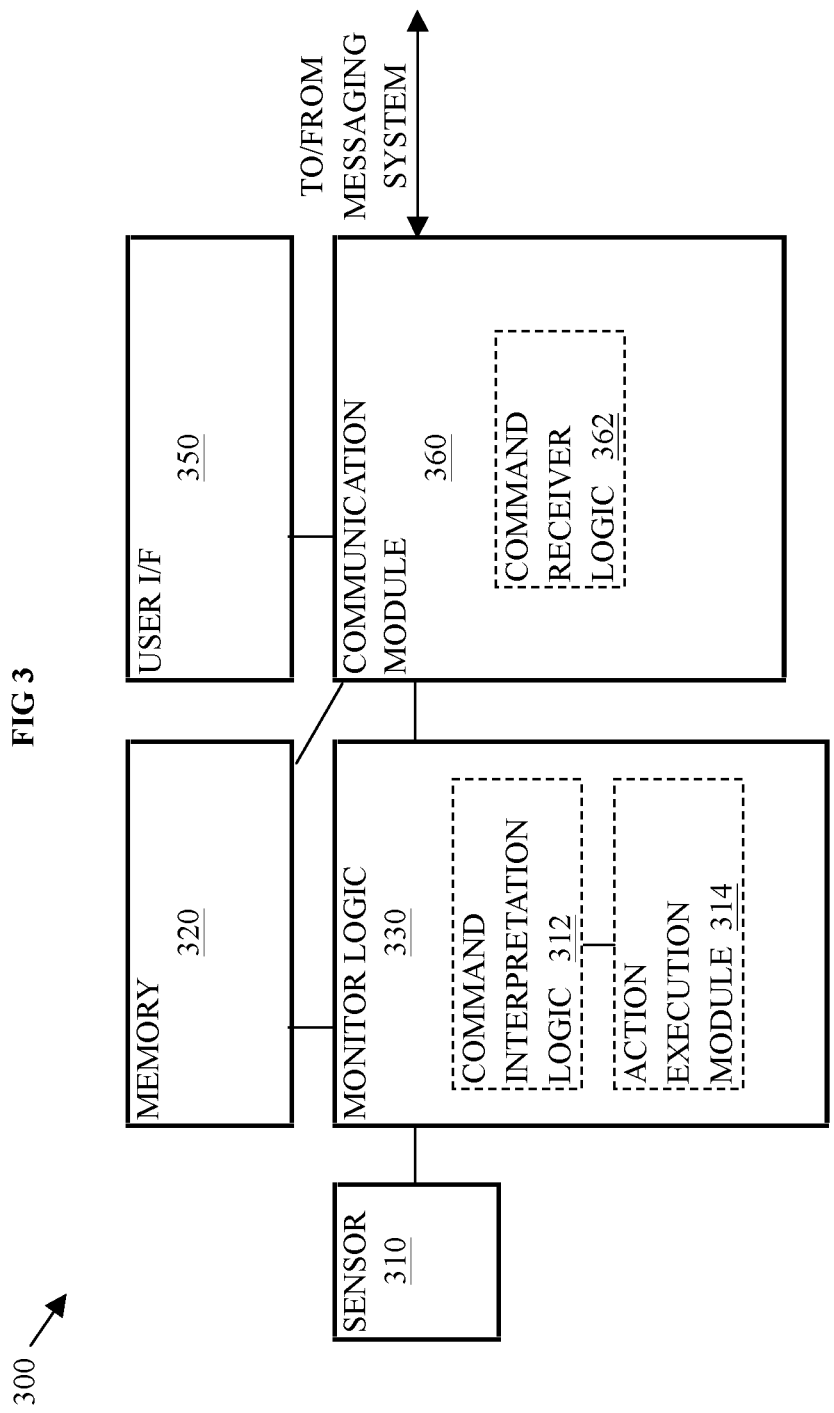
FIG. 3 illustrates an embodiment of a smart sensor to communicate events to a user via a messaging system.

FIG. 3 illustrates an embodiment of a smart sensor 300 to communicate events to one or more users via one or more messaging systems. Smart sensor 300 may be integrated on a single platform and may also be integrated with another device such as an appliance. Smart sensor 300 comprises at least one sensor 310, memory 320, monitor logic 330, user interface 350, and a communication module 360. Sensor 310 may produce a sensor signal.

Memory 320 may couple with monitor logic 330 to store sensor data and one or more messages associated with sensor events. Monitor logic 330 may couple with the at least one sensor 310 to read a sensor signal to determine sensor data, to process the sensor data to detect a sensor event, and to process the sensor event to select a message associated with the sensor event.

Monitor logic 330 may comprise command interpretation logic 312 to monitor a messaging account such as a cellular texting account and/or a Twitter™ account for a reply message that is responsive to a message about a sensor event. The reply message, for instance, may be a reply generated by a user in response to the message about a sensor event. Command interpretation logic 312 may determine a command based upon the reply message and may communicate with an action execution module 314 to execute at least one action based upon the command. For example, a pet with a special diet may need to receive certain distributions of food so the monitor logic may sense when the pet is out of food and communicate with communication module 360 to transmit a message to the user at the next time the pet is supposed to be fed. The user may then reply to the message with text that command receiver 362 receives and transmits to command interpretation logic 312. Command interpretation logic 312 may interpret the command and, in response, issue a command to action execution module 314 to execute at least one action to distribute the next amount of food to the pet's bowl.

In some embodiments, command receiver logic 363 is logic designed to monitor one or more messaging accounts for a reply and to pass the reply to the command interpretation logic 312 of monitor logic 330. In other embodiments, command interpretation logic may be part of communication module 360, which may then issue the command to action execution module 314. In further embodiments, action execution module 314 may be remote from monitor logic 330 or part of the communication module 360.

User interface 350 may interact with a user to determine user-definable settings and to store the user-definable settings in memory 320. In some embodiments, user interface 350 may comprise a display with logic such as a processor and code to interact with the user to set user-definable configurations such as text messages associated with sensor events.

Communication module 360 may couple with monitor logic 330 to interact with at least one messaging system based upon at least one messaging account to post at least one message in the at least one messaging account. Communication module may comprise command receiver logic 362 to monitor a messaging account for postings from a user. In some embodiments, command receiver logic 362 may monitor posts to only certain messaging accounts and/or only after posting a message related to a sensor event. In other embodiments, command receiver logic 362 may continuously or periodically monitor one or more messaging accounts for postings that may represent commands.

Figure 4:
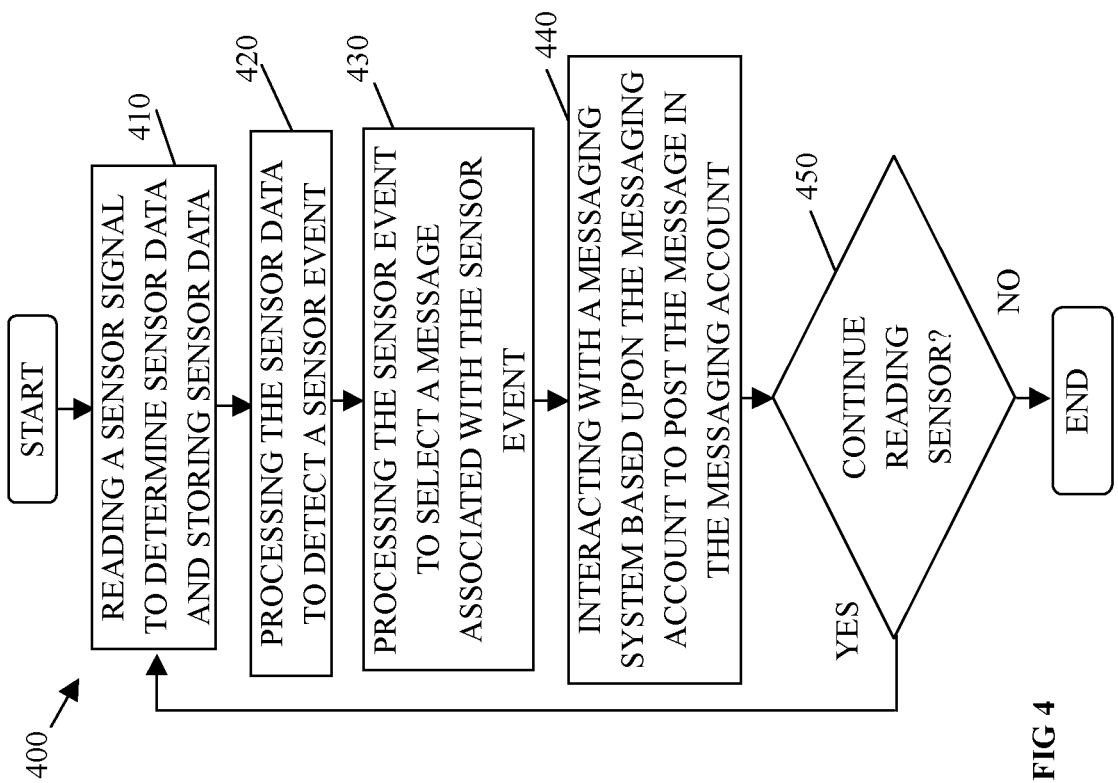
FIG. 4 illustrates a flow chart of an embodiment to communicate events to a user via a messaging system.

FIG. 4 illustrates a flow chart 400 of an embodiment to communicate events to at least one user via at least one messaging system and at least one message account of each of the at least one messaging system. The embodiment involves actions of a smart sensor such as the smart sensors described in FIGS. 1-3. Flow chart 400 begins with reading a sensor signal to determine sensor data and storing the sensor data (element 410). The monitor logic of the smart sensor may read the sensor signal in accordance with a user-defined schedule or a default schedule and may store the data in memory to manipulate the data or process the data to determine if the data represents a sensor event (element 420). For example, the sensor data may be compared with threshold values or included in a calculation to determine a value to compare with threshold values or compared with a prior values or a history of prior values from the sensor, or the like. In some embodiments, processing the sensor data to detect a sensor event may comprise comparing the sensor data to a threshold value, calculating a calculated result based upon the sensor data and historical sensor data and comparing the result to the threshold value, or comparing the sensor data with historical sensor data to determine a comparative result and comparing the comparative result to the threshold value.

The monitor logic may also store the sensor data in memory of the smart sensor to generate a record of historical sensor data. In some embodiments, the smart sensor may compress the historical sensor data. For example, the smart sensor may save memory space by removing repetitive, consecutive sensor data entries in the historical sensor data and/or replacing common patterns of data with indicators of the patterns of data.

Upon detecting a sensor event, the monitor logic processes the sensor event to select a message associated with the sensor event (element 430). For instance, processing the sensor event to select a message may comprise identifying the message associated with the sensor event.

After determining the message, the smart sensor interacts with a messaging system based upon a messaging account to post the message in the messaging account (element 440). For instance, the smart sensor may log into a messaging account or provide the messaging system with a packet identifying the smart sensor as being authorized to access the messaging account and transmitting the message associated with the sensor event. When logging into multiple accounts, the smart sensor may log into the accounts substantially simultaneously or serially. In some embodiments, interacting further comprises transmitting metadata with the message.

In many embodiments, interacting with a messaging system based upon the messaging account to post the message in the messaging account may comprise establishing communication with a Twitter™ web site, logging into a Twitter™ account, and transmitting the message associated with the sensor event to post the message via the Twitter™ account. In further embodiments, interacting with a messaging system based upon the messaging account to post the message in the messaging account comprises identifying the smart sensor as authorized to access a cellular network and transmitting the message associated with the sensor event as a text message.

Once the message is sent in response to the sensor event, the smart sensor may determine whether to continue reading the sensor and return to element 410 or not (element 450). This can be a user-defined setting or a default setting.

Figure 5:
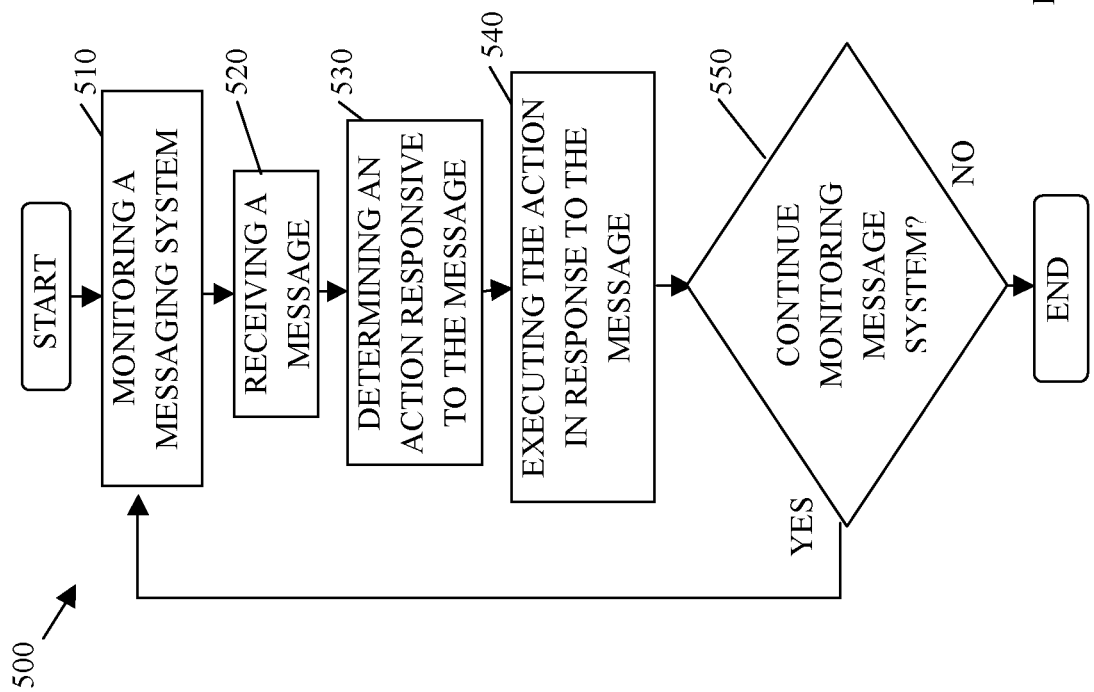
FIG. 5 illustrates a flow chart of an embodiment to communicate a command from a user via a messaging system to the smart sensor to execute an action.

FIG. 5 illustrates a flow chart 500 of an embodiment to communicate a command from a user via a messaging system to the smart sensor to execute an action. Flow chart 500 begins with a smart sensor monitoring a messaging system for a post (element 510). For example, the messaging account may be dedicated for communications related to one or more smart sensors and if a post originates from somewhere other than the smart sensors, the smart sensors may determine that the posting may be a command from a user.

Upon receiving a message (element 520), the smart sensor may determine an action responsive to the message (element 530). For instance, the smart sensor may authenticate that the user posted the message via an identification on the posting, via metadata attached to the posting, or the like. Once the posting is authenticated, the smart sensor may interpret the message to determine if the message represents a valid command. In some embodiments, messages may also identify the particular smart sensor that should execute the action associated with the command in the message. If the message represents a valid command, the smart sensor may transmit to command to an action execution module for executing the action in response to the message (element 540).

In some embodiments, the smart sensor will continue to monitor the messaging account for further postings (element 550). In other embodiments, the smart sensor may not continue monitoring for another posting once a command is executed by that sensor. In further embodiments, smart sensors may monitor the messaging account for postings at pre-programmed times or time intervals.

Another embodiment is implemented as a program product for implementing systems and methods described with reference to FIGS. 1-5. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates smart sensors. It is understood that the form of the embodiments shown and described in the detailed description and the drawings are to be taken merely as examples. It is intended that the following claims be interpreted broadly to embrace all variations of the example embodiments disclosed.

Although the present disclosure has been described in detail for some embodiments, it should be understood that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus comprising:
   an image sensor to provide image sensor data of an environment;
   memory;
   machine-readable instructions; and
   at least one processor circuit to execute the machine-readable instructions to at least:
   access the image sensor data;
   detect a security event in the environment, the security event associated with motion; and
   cause transmission of a first message to cause display of an alert associated with the security event on a mobile phone, the alert including at least a first portion of an image corresponding to the image sensor data, the first message in accordance with a first communication protocol; and
   cause transmission of an email message associated with the security event, the email message to cause display of the alert and at least one of the first portion of the image, another portion of the image, or at least a portion of another image corresponding to the security event, the email message in accordance with a second communication protocol, the second communication protocol different than the first communication protocol.

2. The apparatus of claim 1, wherein the image corresponds to an area within a perimeter.

3. The apparatus of claim 1, wherein one or more of the at least one processor circuit is to cause transmission of a video recording representative of the security event, the video recording to be presented via the mobile phone.

4. The apparatus of claim 3, wherein the image includes a thumbnail of the video recording.

5. The apparatus of claim 1, wherein one or more of the at least one processor circuit is to cause transmission of the first message to a messaging application on the mobile phone.

6. The apparatus of claim 1, wherein the security event is defined by a user input.

7. A security apparatus comprising:
   a sensor;
   machine-readable instructions; and
   at least one processor circuit to execute the machine-readable instructions to:
   detect motion based on data from the sensor;
   cause transmission of a notification to a mobile phone, the notification to cause display of an image associated with the motion on the mobile phone, the notification in accordance with a first communication protocol; and
   cause transmission of an email message associated with the motion, the email message to cause display of at least one of the image, a portion of the image, or at least a portion of another image associated with the motion, the email message in accordance with a second communication protocol, the second communication protocol different than the first communication protocol.

8. The security apparatus of claim 7, wherein one or more of the at least one processor circuit is to cause transmission of a video recording representative of the motion to be presented via the mobile phone.

9. The security apparatus of claim 8, wherein the image includes a thumbnail of the video recording.

10. The security apparatus of claim 7, wherein a property of the motion is definable via a user input.

11. The security apparatus of claim 7, wherein one or more of the at least one processor circuit is to cause transmission of the notification to a messaging application on the mobile phone.

12. The security apparatus of claim 7, wherein the motion is within a security parameter.

13. At least one storage device comprising machine-readable instructions to cause at least one processor circuit to at least:
   access image sensor data of an environment, the image sensor data output by an image sensor in the environment;
   detect a security event in the environment, the security event associated with motion; and
   cause transmission of a first message to a mobile phone, the first message to trigger an alert associated with the security event on the mobile phone, the alert indicative of an availability of an image corresponding to the image sensor data, the first message in accordance with a first communication protocol; and
   cause transmission of an email message associated with the security event, the email message to cause display of the alert and at least one of the image, a portion of the image, or at least a portion of another image corresponding to the image sensor data, the email message in accordance with a second communication protocol, the second communication protocol different than the first communication protocol.

14. The at least one storage device of claim 13, wherein the image is part of a video recording.

15. The at least one storage device of claim 13, wherein the machine-readable instructions are to cause one or more of the at least one processor circuit to trigger the alert by causing transmission of a message to an application on the mobile phone, the image accessible via the application.

16. The at least one storage device of claim 13, wherein the machine-readable instructions are to cause one or more of the at least one processor circuit to detect the security event based on an event rule, the event rule defined by a user input.

17. The at least one storage device of claim 13, wherein the image sensor data is associated with a user-defined perimeter.

18. The apparatus of claim 1, wherein the image is accessible via the first message.

19. The security apparatus of claim 7, wherein the notification includes text and the image is displayed with the text.

20. The at least one storage device of claim 13, wherein the image is an attachment to the alert.

21. The apparatus of claim 1, wherein the at least the first portion of the image includes historical image data.

22. The apparatus of claim 1, wherein the first message includes text.

23. The security apparatus of claim 7, wherein the image includes historical data.

* * * * *